US009013405B2

(12) United States Patent
Kujawski et al.

(10) Patent No.: US 9,013,405 B2
(45) Date of Patent: Apr. 21, 2015

(54) TOUCH-SCROLLING PAD FOR COMPUTER INPUT DEVICES

(75) Inventors: Christopher H. Kujawski, Seattle, WA (US); Anthony A. Torrence, Bellevue, WA (US); Yuan-Chou Chung, Sammamish, WA (US); Carl E. Picciotto, Clyde Hill, WA (US); Michael R. Schweers, Seattle, WA (US); Matthew G. Pedersen, Seattle, WA (US); Niño Aldrin L. Sarmiento, Redmond, WA (US); Martyn S. Jackson, Redmond, WA (US); Scott Mitchel Mail, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 506 days.

(21) Appl. No.: 13/338,472

(22) Filed: Dec. 28, 2011

(65) Prior Publication Data

US 2013/0169424 A1    Jul. 4, 2013

(51) Int. Cl.
| | |
|---|---|
| G06F 3/033 | (2013.01) |
| G09G 5/08 | (2006.01) |
| G06F 3/0354 | (2013.01) |
| G08B 6/00 | (2006.01) |

(52) U.S. Cl.
CPC .............. G08B 6/00 (2013.01); G06F 3/03543 (2013.01)

(58) Field of Classification Search
CPC .................... G06F 3/03547; G06F 2203/0339; G06F 1/169
USPC .................................. 345/158, 173, 156, 163
See application file for complete search history.

(56) References Cited

U.S. PATENT DOCUMENTS

| | | | |
|---|---|---|---|
| 7,355,595 B2 | 4/2008 | Bathiche et al. | |
| 7,576,732 B2 | 8/2009 | Lii | |
| 7,710,397 B2 | 5/2010 | Krah et al. | |
| 2006/0119586 A1 | 6/2006 | Grant et al. | |
| 2006/0274042 A1 | 12/2006 | Krah et al. | |
| 2007/0013677 A1 | 1/2007 | Rosenberg et al. | |
| 2008/0062144 A1* | 3/2008 | Shahoian et al. ............. | 345/173 |
| 2010/0079404 A1 | 4/2010 | Degner et al. | |
| 2010/0245258 A1 | 9/2010 | Stewart et al. | |

(Continued)

OTHER PUBLICATIONS

"Enable Horizontal Scroll by mouse-pad", Retrieved at <<http://www.google.com/support/forum/p/Chrome/thread?tid=535d2b5b2081c81b&hl=en>>, Retrieved Date: Jul. 21, 2011, pp. 2.
"Lcd Drawer User Manual", Retrieved at <<http://www.longshine.de/longshine/products/kvm/KL-708M/KL-708M-manual_eng.pdf>>, Retrieved Date: Jul. 21, 2011, pp. 11.

(Continued)

*Primary Examiner* — Gerald Johnson
(74) *Attorney, Agent, or Firm* — Jeremy Snodgrass; Judy Yee; Micky Minhas

(57) ABSTRACT

In embodiments of a touch-scrolling pad for computer input devices, a touch sensor strip detects touch contacts on a touch-scrolling pad that is implemented for vertical scrolling input and horizontal scrolling input. A selectable button positioned proximate below the touch sensor strip can be selected by an actuation depress input to the touch-scrolling pad. The touch-scrolling pad includes programmed instructions in firmware implemented to determine that a touch contact is one of a vertical scrolling input, a horizontal scrolling input, or the actuation depress input to actuate the selectable button. The touch-scrolling pad also includes a haptic system that generates haptic feedback responsive to either of the vertical scrolling input or the horizontal scrolling input.

20 Claims, 5 Drawing Sheets

(56) References Cited

U.S. PATENT DOCUMENTS

2011/0001704 A1    1/2011  Shaw et al.
2011/0109552 A1    5/2011  Yasutake
2013/0050099 A1*   2/2013  Hirano et al. ................ 345/173

OTHER PUBLICATIONS

"PCT Search Report and Written Opinion", Application No. PCT/US2012/069329, (Mar. 29, 2013), 10 pages.

* cited by examiner

TOUCH-SCROLLING PAD FOR COMPUTER INPUT DEVICES

BACKGROUND

A computer mouse is a common computer input peripheral used to interact with a computing device, and there are many different configurations and mouse designs with various switches, selection buttons, and a vertical scroll wheel to vertically scroll and/or initiate a selection input. Some mouse configurations include a capacitive sensor pad rather than a scroll wheel, and the touch-pad can be used for both vertical scrolling and tap-touch inputs. However, a user input to initiate a vertical scrolling input may inadvertently actuate the sensor and initiate a tap-touch input to a computing device, which frustrates the user experience.

Some computer mouse devices provide for horizontal scrolling with two or more user input actions. For example, a user can select a horizontal scroll bar on a displayed document or Web page with a mouse pointer, and then drag the scroll bar in a horizontal direction. Alternatively, a user can use keyboard arrow keys and/or hold down a keyboard key while also using a vertical scroll wheel to initiate horizontal scrolling. Alternatively, a computer mouse device may include a vertical scroll wheel that can be tilted from side-to-side to initiate horizontal scrolling when tilted to one side or the other by a user.

SUMMARY

This Summary introduces simplified concepts of a touch-scrolling pad for computer input devices, and the concepts are further described below in the Detailed Description and/or shown in the Figures. This Summary should not be considered to describe essential features of the claimed subject matter, nor used to determine or limit the scope of the claimed subject matter.

A touch-scrolling pad for computer input devices is described. In embodiments, a touch sensor strip detects touch contacts on a touch-scrolling pad that is implemented for vertical scrolling input and horizontal scrolling input. A selectable button positioned proximate below the touch sensor strip can be selected by an actuation depress input to the touch-scrolling pad. The touch-scrolling pad includes programmed instructions in firmware implemented to determine that a touch contact is one of a vertical scrolling input, a horizontal scrolling input, or the actuation depress input to actuate the selectable button. The touch-scrolling pad also includes a haptic system that generates haptic feedback responsive to either of the vertical scrolling input or the horizontal scrolling input.

In other embodiments, the haptic system can be implemented to generate the haptic feedback for a similar perception of vibration magnitude for both vertical scrolling inputs and horizontal scrolling inputs. Alternatively, the haptic system can be implemented to generate a first strength of the haptic feedback responsive to a vertical scrolling input, and generate a second, different strength of the haptic feedback responsive to a horizontal scrolling input. The different strengths of the haptic feedback can be generated to differentiate between vertical scrolling inputs and horizontal scrolling inputs. The haptic system can be powered directly from a battery, such as the battery in a computer mouse device, and the programmed instructions in firmware regulate a strength of the haptic feedback over varying battery voltages.

In other embodiments, the touch sensor strip is suspended for freedom of movement. The touch sensor strip can then vibrate as the haptic feedback responsive to either of the vertical scrolling inputs or the horizontal scrolling inputs. In an implementation, the touch sensor strip is suspended with a hinge at one end and a spring assembly at the other, and the touch sensor strip rotates about a hinge axis of the hinge to actuate the selectable button that is proximate below the touch sensor strip. The touch sensor strip includes sensor regions by which the programmed instructions in firmware can differentiate a horizontal scrolling input from a vertical scrolling input. Alternatively or in addition, the touch sensor strip includes programmable regions by which the programmed instructions in firmware can distinguish touch-scrolling pad inputs.

BRIEF DESCRIPTION OF THE DRAWINGS

Embodiments of a touch-scrolling pad for computer input devices are described with reference to the following Figures. The same numbers may be used throughout to reference like features and components that are shown in the Figures.

DETAILED DESCRIPTION

Embodiments of a touch-scrolling pad for computer input devices, such as a computer mouse device, are described. The touch-scrolling pad provides that a user can scroll a displayed document or Web page both vertically and/or horizontally using a capacitive sensor mounted above a physical switch (rather than a "virtual button"), while receiving tactile feedback from a haptic system that simulates scrolling with a traditional detented scroll wheel. The touch-scrolling pad also provides a better user experience than with a conventional computer mouse device that implements a capacitive sensor for both vertically scrolling and virtual button input. As noted above, a user input to initiate vertical scrolling with a conventional computer mouse device may inadvertently initiate a tap-touch, virtual button input to a computing device, which can be frustrating for a user. Embodiments of the touch-scrolling pad described herein also allows for both vertical and horizontal scrolling with inertia (e.g., "flicking"), and is implemented to avoid inadvertent selectable button actuation.

While features and concepts of a touch-scrolling pad for computer input devices can be implemented in any number of different devices, systems, environments, and/or configurations, embodiments of a touch-scrolling pad for computer input devices are described in the context of the following example devices, systems, and methods.

Figure 1:
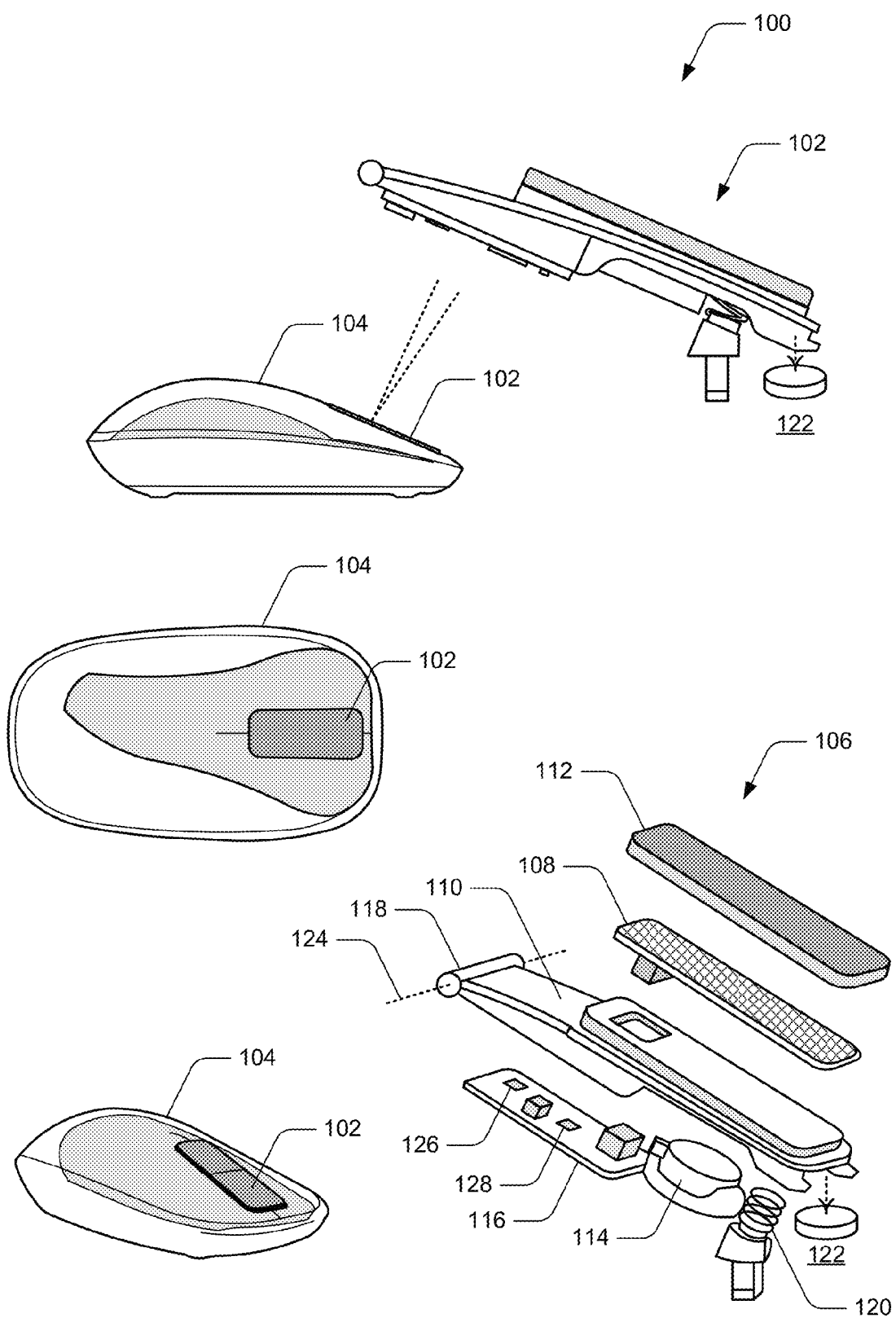
FIG. 1 illustrates examples of a touch-scrolling pad for computer input devices in accordance with one or more embodiments.

FIG. 1 illustrates an example 100 of a touch-scrolling pad 102, which can be implemented for various computer input devices. In this example, the touch-scrolling pad is shown implemented in a computer mouse device 104 that is shown in a side, top, and perspective view. Additionally, a touch-scrolling pad may be integrated in a portable computing device, as a component of a computer keyboard, or other computer peripheral input device.

Components of the touch-scrolling pad 102 are also shown in an exploded view at 106. The touch-scrolling pad includes a touch sensor strip 108 that mounts onto a component support structure 110 of the touch-scrolling pad, and includes a cover 112 over the touch sensor strip. In embodiments, the touch sensor strip is implemented to detect touch contacts that a user initiates as vertical scrolling inputs and horizontal scrolling inputs. The touch-scrolling pad includes a haptic system 114 that generates haptic feedback responsive to either of the vertical scrolling inputs or horizontal scrolling inputs. The haptic feedback can be generated as vibration pulses, and each haptic pulse is sent to the touch sensor strip concurrently with a scrolling input to a computing device for synchronized physical and visual output to the user. The touch-scrolling pad also includes an integrated circuit 116 that interconnects the haptic system and the touch-scrolling pad in the computer mouse device.

In embodiments, the touch sensor strip (e.g., with the component support structure 110) is suspended for freedom of movement, such as to vibrate and provide a haptic feedback to a user. In this example, the touch sensor strip 108 is suspended with a hinge 118 at a first end of the touch sensor strip and a spring assembly 120 at a second end of the touch sensor strip. In other implementations, the touch sensor strip may be suspended in a springboard configuration or any other configurations utilized that provide a mechanical freedom of movement. When suspended, the touch sensor strip can vibrate as haptic feedback responsive to vertical scrolling inputs and horizontal scrolling inputs.

A selectable button 122 (e.g., a mechanical or electro-mechanical switch) is positioned proximate below the touch sensor strip 108, and the selectable button can be selected by a user who presses down on the touch-scrolling pad to initiate an actuation depress input. In this example, the first end of the touch sensor strip (e.g., the hinged end) rotates about a hinge axis 124 to compress the spring of the spring assembly 120 and actuate the selectable button. The suspension feature provides that the touch sensor strip can be pressed down to actuate the selectable button, and provides that the touch sensor strip has enough freedom of movement in the structure to vibrate. In an alternate implementation, the touch sensor strip may be in direct contact with the selectable button. Additionally, the spring assembly and/or additional clamping forces around a hinge-pin of the hinge can provide that the touch-scrolling pad feels firm and stable to the user.

The touch-scrolling pad 102 can be implemented with programmed instructions in firmware 126 on the integrated circuit 116. The programmed instructions may also be implemented as computer-executable instructions, such as a software application, algorithm, or module, executed by a microprocessor to implement various embodiments described herein. Implementations of the programmed instructions are described further with reference to the following FIGS. 2-5.

The touch-scrolling pad 102 is implemented to avoid inadvertent actuation of the selectable button 122, such as caused by a user resting a hand on the computer mouse device or re-gripping during use, yet the touch-scrolling pad is long and wide enough to provide for vertical scrolling inputs and horizontal scrolling inputs. In an example implementation, the touch-scrolling pad tapers from approximately 13 mm at the back (e.g., toward the palm of user's hand) to approximately 14 mm at the front (e.g., toward the user's fingertips), which mimics the natural splay of a user's pointer and middle fingers. This also provides a generally wider area on the touch-scrolling pad for horizontal scrolling inputs where the finger sweep is generally the widest at a user's finger tip. As shown in the example side and perspective views of the computer mouse device 104, the cover 112 of the touch-scrolling pad can be positioned approximately 1 mm above the finger rest areas on the computer mouse device so that a user can locate an edge or boundary of the touch-scrolling pad without inadvertently initiating a scrolling input.

The haptic system 114 of the touch-scrolling pad 102 can be implemented to generate a the haptic feedback for similarity of both vertical scrolling inputs and horizontal scrolling inputs so that a feedback vibration, for example, is perceived consistent by a user. Generally, a user initiates more touch contact with the touch-scrolling pad for vertical scrolling than for horizontal scrolling, and less energy would otherwise be transmitted to the touch sensor strip as the haptic feedback in response to a horizontal scrolling input. Accordingly, the magnitude of an electrical drive that supplies the energy for a haptic vibrator may be different for a vertical scrolling input than a horizontal scrolling input so that user perception of the magnitude of the surface vibrations is similar. Alternatively, the haptic system can be implemented to generate a first strength of the haptic feedback responsive to a vertical scrolling input, and generate a second, different strength of the haptic feedback responsive to a horizontal scrolling input. The different strengths of the haptic feedback can be generated for a user to differentiate between a vertical scrolling input and a horizontal scrolling input. Although haptic feedback is primarily described herein as vibration of the touch-scrolling pad, the haptic feedback can be generated as a vibration and/or audible feedback, for a long or short duration, and at varying levels of strength or intensity.

Additionally, the haptic system 114 can be powered directly from the one or more batteries that power the computer mouse device 104, and the programmed instructions in firmware 126 are implemented to regulate a strength of the haptic feedback over varying battery voltages. For example, a new battery may provide 3 volts, but fade to only 2 volts over time. The programmed instructions are implemented to monitor battery voltage and subsequently modify the number and width of applied pulses to maintain a consistent power delivery. The integrated circuit 116 includes a bipolar drive circuit 128 that provides the regulated haptic feedback strength over varying battery voltages. An H-bridge is implemented to drive the haptic system with a bipolar voltage, which imparts a maximum amount of energy in a minimum amount of time, to maintain a consistent response, even as the battery voltage drops or fades, and more pulses are added to generate the haptic feedback.

Figure 2:
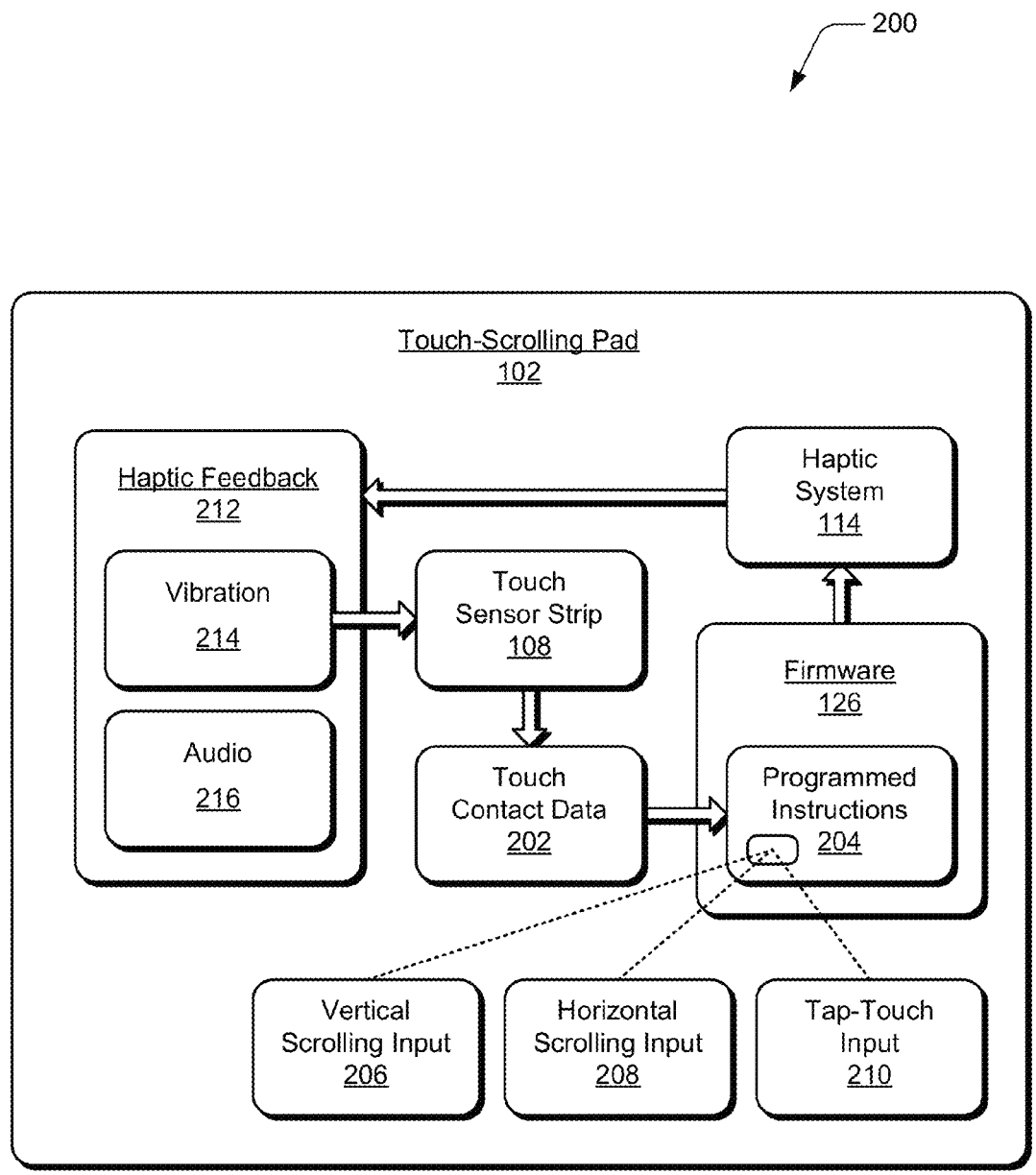
FIG. 2 illustrates various components of an example touch-scrolling pad for computer input devices in accordance with one or more embodiments.

FIG. 2 illustrates various components 200 of the example touch-scrolling pad 102 described with reference to FIG. 1. The touch sensor strip 108 detects touch contacts that are communicated as touch contact data 202 to the firmware 126. The programmed instructions 204 are implemented to process the touch contact data that corresponds to a touch contact, or a combination of touch contacts, and determine that the touch contact is a vertical scrolling input 206, a horizontal scrolling input 208, or a tap-touch input 210 to the touch-scrolling pad. The programmed instructions in firmware also initiate the haptic system 114 to generate the haptic feedback 212, which may be generated as vibration 214 and/or audio 216 feedback. The vibration feedback can then be communicated to the touch sensor strip that vibrates as a user indication of a vertical or horizontal scrolling input. Additionally, the haptic feedback for inertial scrolling (also referred to herein as 'flicking' or flick-scrolling) can be implemented to vibrate the body of the computer mouse device 104, rather than just the touch sensor strip, for user perception while flick-scrolling as user contact with touch sensor strip is on and off.

In implementations, the computer mouse device 104 that includes the touch-scrolling pad 102 communicates the vertical scrolling inputs and the horizontal scrolling inputs to a computing device that translates the inputs to a display feature, such as to vertically or horizontally scroll a displayed document or Web page. The computing device can include a software application via which a user can set and/or adjust parameters of the computer mouse device and/or the touch-scrolling pad features. For example, the resolution and speed of both the vertical scrolling and the horizontal scrolling can be adjusted, as well as the strength and type of haptic feedback. The software application in the computing device can be implemented to provide feedback to the computer mouse device, such as when a current foreground window is demoted in its Z-order of display (e.g., essentially becomes a background window). For example, when the mouse device is actively sending "flick" scroll events to the foreground of a displayed document or page, and the user or operating system changes the foreground window, the software application driver will signal the mouse device to stop sending the 'flick' scroll events. This prevents active flick scrolling on a current foreground displayed document or page to be continued on the new, active foreground displayed document or page.

Figure 3:
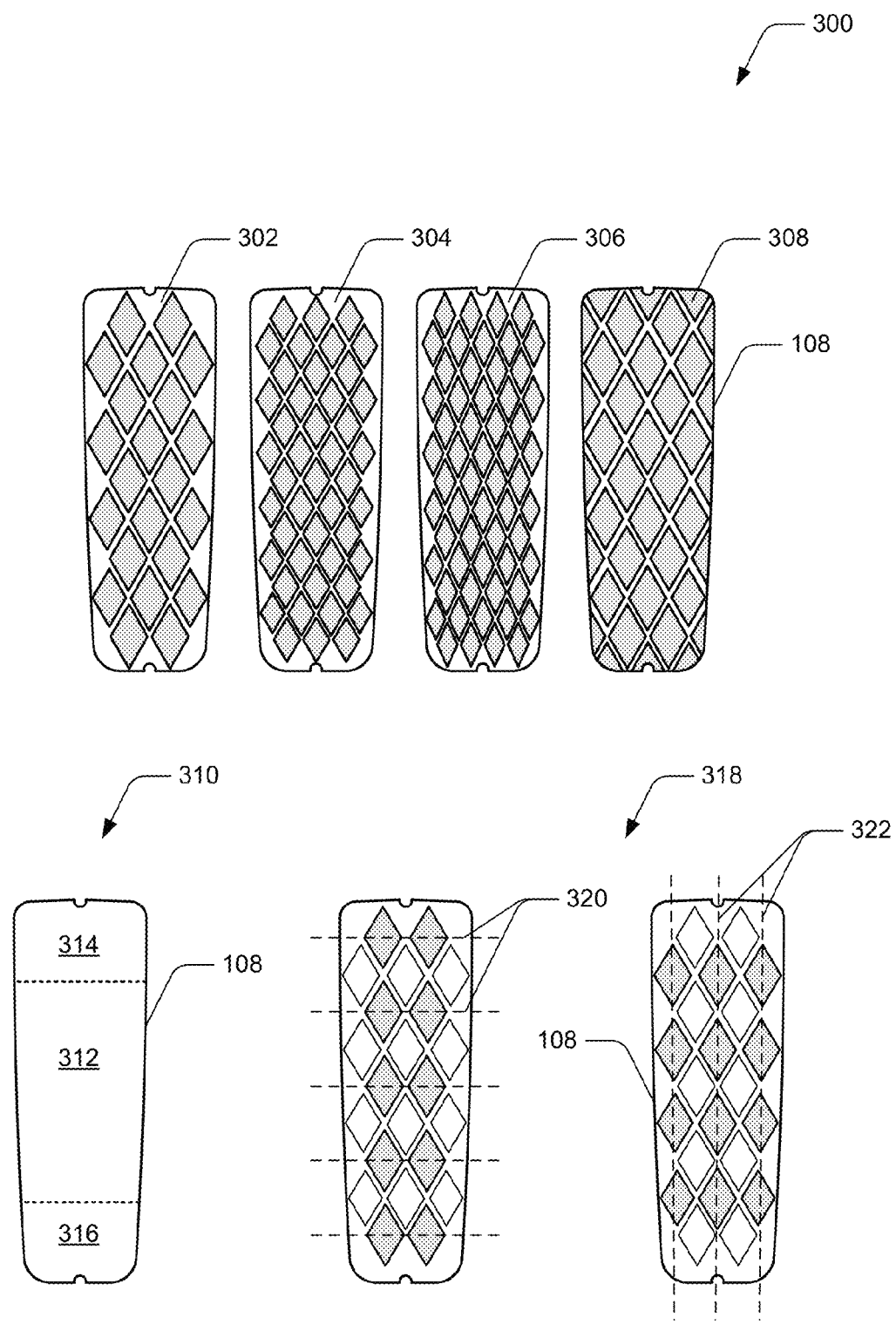
FIG. 3 illustrates example configurations of a touch sensor strip in a touch-scrolling pad for computer input devices in accordance with one or more embodiments.

FIG. 3 illustrates example configurations 300 of the touch sensor strip 108 for a touch-scrolling pad, such as the touch-scrolling pad 102 described with reference to FIG. 1. In this example, the touch sensor strip may be implemented with a trapezoidal sensor configuration of capacitive sensors, such as in a 5×3 pattern shown at 302, a 7×4 pattern shown at 304, or a 7×5 pattern shown at 306. The touch sensor strip may also be implemented with the sensor configuration pattern shown at 308, where half-trapezoid sensor regions are positioned at the edges of the touch sensor strip. Although only four different sensor configuration patterns are shown, a touch sensor strip may be implemented with any number of various sensor configurations and/or sensors of different types and shapes. A sensor configuration of the 5×3 pattern shown at 302 or at 308 provides for adequate capacitive signals when used with a thicker cover 112 over the touch sensor strip due to the larger sensor pad area. Additionally, the 5×3 sensor pattern shown at 302 includes only eight sensor pads, which reduces overall sensor sampling times and sensor processing times that reduces overall power consumption.

In embodiments, a touch sensor strip 108 can include programmable regions by which the programmed instructions in firmware can distinguish touch-scrolling pad inputs. For example, the touch sensor strip shown at 310 has three defined programmable regions, of which a center region 312 may be programmed for vertical and horizontal scrolling inputs, and two end regions 314, 316 may be programmed for other various user-selectable inputs to the computer mouse device and/or to a computing device. The representation and size of the illustrated three regions of the touch sensor strip are shown at 310 merely for discussion and, in practice, may be implemented in various configurations, shapes, and sizes.

In embodiments, the touch contact data 202 that corresponds to touch contacts on a touch sensor strip 108 can be processed by the programmed instructions in firmware 126 according to sensor regions of the touch sensor strip. In the example shown at 318, the diamond patterns of the capacitive sensors on the touch sensor strip form vertical sensor regions 320 (i.e., arranged horizontally in context to detect vertical scrolling inputs) and horizontal sensor regions 322 (i.e., arranged vertically in context to detect horizontal scrolling inputs). The programmed instructions 204 are implemented to differentiate horizontal scrolling inputs from vertical scrolling inputs based on the horizontal sensor regions and the vertical sensor regions. Additionally, the programmed instructions can detect finger momentum velocity in either horizontal or vertical directions based on the sensor regions of the touch sensor strip for use in flick scroll operations and a touch-to-stop input. In implementations, the sensors along the edges of a touch sensor strip may be implemented for only partial or minimal touch contact input to allow a user locating an edge of the touch-scrolling pad by feeling the edges, without initiating a vertical or horizontal scroll event.

Figure 4:
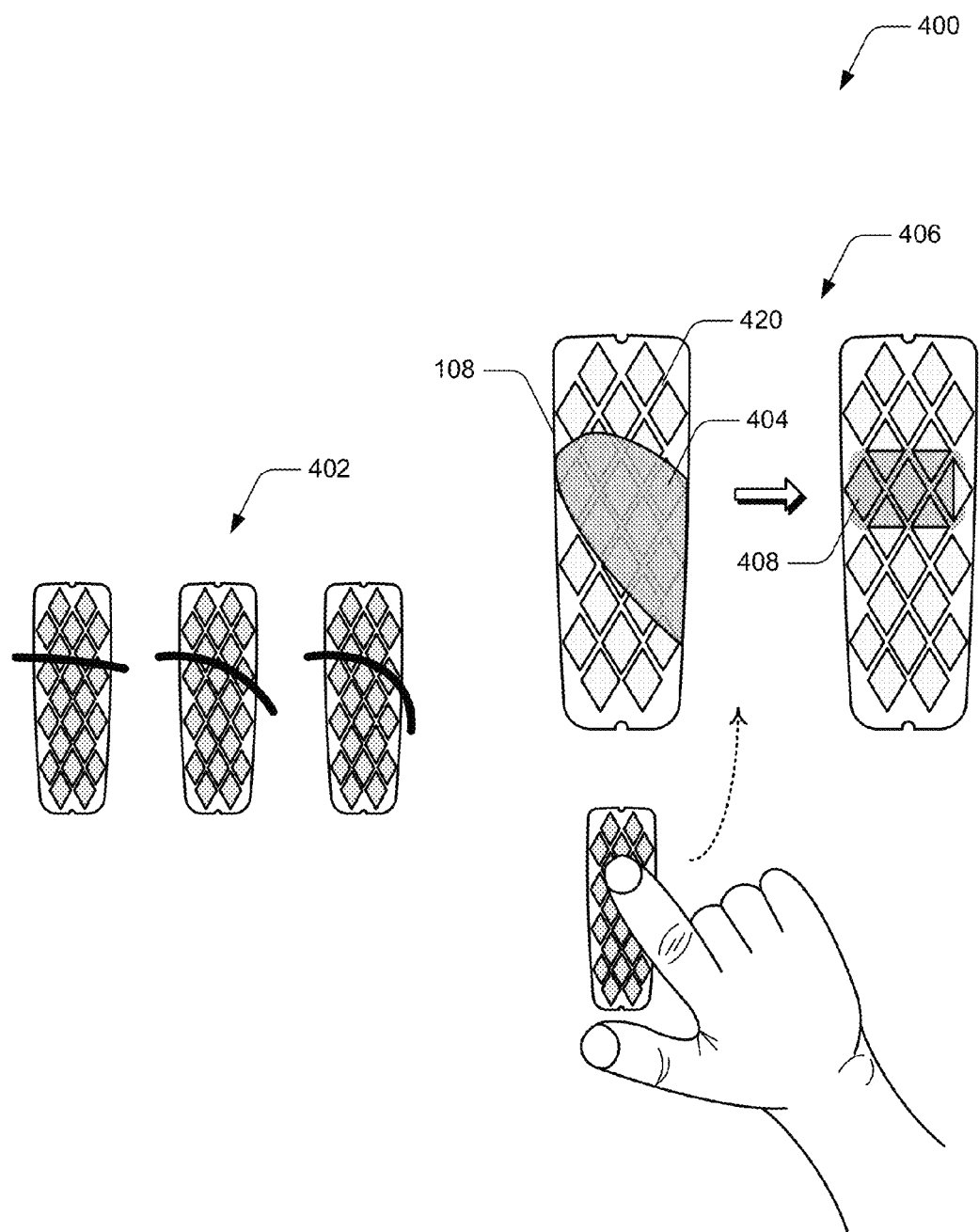
FIG. 4 further illustrates the example configurations of a touch sensor strip in a touch-scrolling pad for computer input devices in accordance with one or more embodiments.

FIG. 4 illustrates example configurations 400 of the touch sensor strip 108 for a touch-scrolling pad, such as the touch-scrolling pad 102 described with reference to FIG. 1. Detecting and/or determining horizontal scrolling inputs on a touch-scrolling pad 102 is a challenge with the narrow touch sensor strip 108, as there is generally not much distinction on user intent between a horizontal scrolling input and a vertical scrolling input. For example, as shown at 402, a user typically will not initiate a horizontal scrolling input in a horizontal, straight line (e.g., perpendicular to the length of the touch sensor strip), but rather in some degree of a diagonal input across the sensors of the touch sensor strip.

When a vertical scrolling input is detected on the edges of the touch sensor strip (e.g., at position 0% or 100% on a scale of 0-100% that correlates to the width of the touch sensor strip), the vertical entry position can be readjusted to match the vertical position of a user's input finger. This prevents a vertical scroll lock from being engaged early in the touch input motion. In implementations, an edge entry position to approximately 75% on the opposite edge will generate a single horizontal scroll event. A center entry position to about 75% on either opposite edge will also generate a single horizontal scroll event. An entry position from 40-60% (e.g., on the 0-100% scale) is recognized as a position entry at 50% to allow a middle to edge horizontal scroll event to be recognized and initiated.

In embodiments, the programmed instructions in firmware 126 are implemented to cap horizontal touch contact data 202 to prevent centroid position inaccuracies, and to generate an evenly distributed contact regardless of how much touch contact area is detected or sensed by the sensors in the touch sensor strip. This is due to the long contact area used for the sensors to track horizontal scrolling inputs. For example, a user touch contact 404 on the touch sensor strip 108 is shown at 406, and an evenly distributed contact 408 is generated. Sensor data counts in the sensor regions can be used to compute the centroid, and a larger finger contact on a respective sensor region is generated as a larger sensor data count. As shown in the example for a user touch contact at an angle, the sensor data counts are not equal which can cause an inaccurate centroid determination at the sensor region with the larger touch contact surface. Accordingly, the programmed instructions cap the sensor data counts to generate the evenly distributed contact 408 over the sensor regions of the touch sensor strip.

The programmed instructions in firmware are also implemented to generate a flick scrolling distance as a function of finger touch input velocity. The angle of a user's finger touch inputs on a sensor or in a sensor region, the finger pressure, and/or the finger contact area, may not be consistent from one horizontal scrolling input to the next. Further, the scrolling inputs likely will not have a consistent velocity when initiating scrolling inputs from left-to-right, right-to-left, top-to-bottom, or from bottom-to-top. Accordingly, the programmed instructions determine velocity range bands at finger liftoff that translate to a fixed number of scroll events that determines how far to scroll a displayed document or Web page based on the flick input. This provides a consistent vertical or horizontal scrolling response regardless of vertical or horizontal scrolling input direction, velocity, or which finger is used to initiate the vertical or horizontal scrolling. Additionally, the programmed instructions implemented firmware allows for two velocity bands that specifies the two scroll distances. For example, a short flick velocity band will generate twelve scroll counts while a long flick velocity band will generate one-hundred and twelve scroll counts. This provides approximately the same user experience when flicking in one direction, and then flicking in the reverse direction to return to the same or close to the same starting location.

The programmed instructions in firmware are also implemented to maintain a determined scrolling direction (e.g., vertical scroll lock or horizontal scroll lock) until the user lifts a finger touch contact off of the touch sensor strip. A vertical scrolling input is tracked and moves vertically along the length of the touch sensor strip a number of positions (e.g., defined by distance, sensors, regions, etc.) to generate a vertical scroll lock. Similarly, a horizontal scrolling input is tracked and moves horizontally along the width of the touch sensor strip approximately 75% of the distance from an initial position to an opposite edge (whichever is the farthest) to generate a horizontal scroll event. Therefore, the vertical and horizontal thresholds are approximately the same in distance for finger input movement. In implementations, either the vertical scroll lock or the horizontal scroll lock can be prioritized in an event that the vertical and horizontal thresholds are reached at the same time.

The programmed instructions in firmware are also implemented to reduce power consumption of the capacitive sensing, which can use a lot of power to continuously sample in order to detect touch contact inputs on a touch sensor strip. A maximum sampling rate is initiated when a touch contact input is detected. When there is no contact detected, the programmed instructions in firmware can be implemented to maintain a maximum sampling rate of one second before switching into an idle mode that uses a minimum sampling rate. Additionally, only the edge horizontal sensors are sampled in the idle mode to reduce the processing and power consumption. Alternatively, when the computer mouse device has not been moved for a long duration, the firmware can initiate a dormant mode with no sampling for capacitive sensing.

The programmed instructions in firmware can also track capacitive sensing baselines. Changes in temperature can cause measured capacitances to drift, and the baseline capacitances (e.g., capacitances measured with no touch contact input to the touch sensor strip) are monitored and tracked to be able to then detect the presence of a finger touch contact input. Tracking the baseline effectively can accommodate a lower signal-to-noise ratio, and therefore enhance sensitivity. Additionally, when a touch contact remains in the same position (not moving) for more than one second, the baseline tracking is temporarily disabled to prevent base-lining of the adjacent sensors with partial finger touch contacts. This prevents an adjacent sensor baseline from being saturated to a point that it can no longer distinguish a finger contact. When the contact movement is detected, the baseline tracking is re-enabled.

Example method 500 is described with reference to FIG. 5 in accordance with one or more embodiments of a touch-scrolling pad for computer input devices. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. Further, the features described herein are platform-independent and can be implemented on a variety of computing platforms having a variety of processors.

Figure 5:
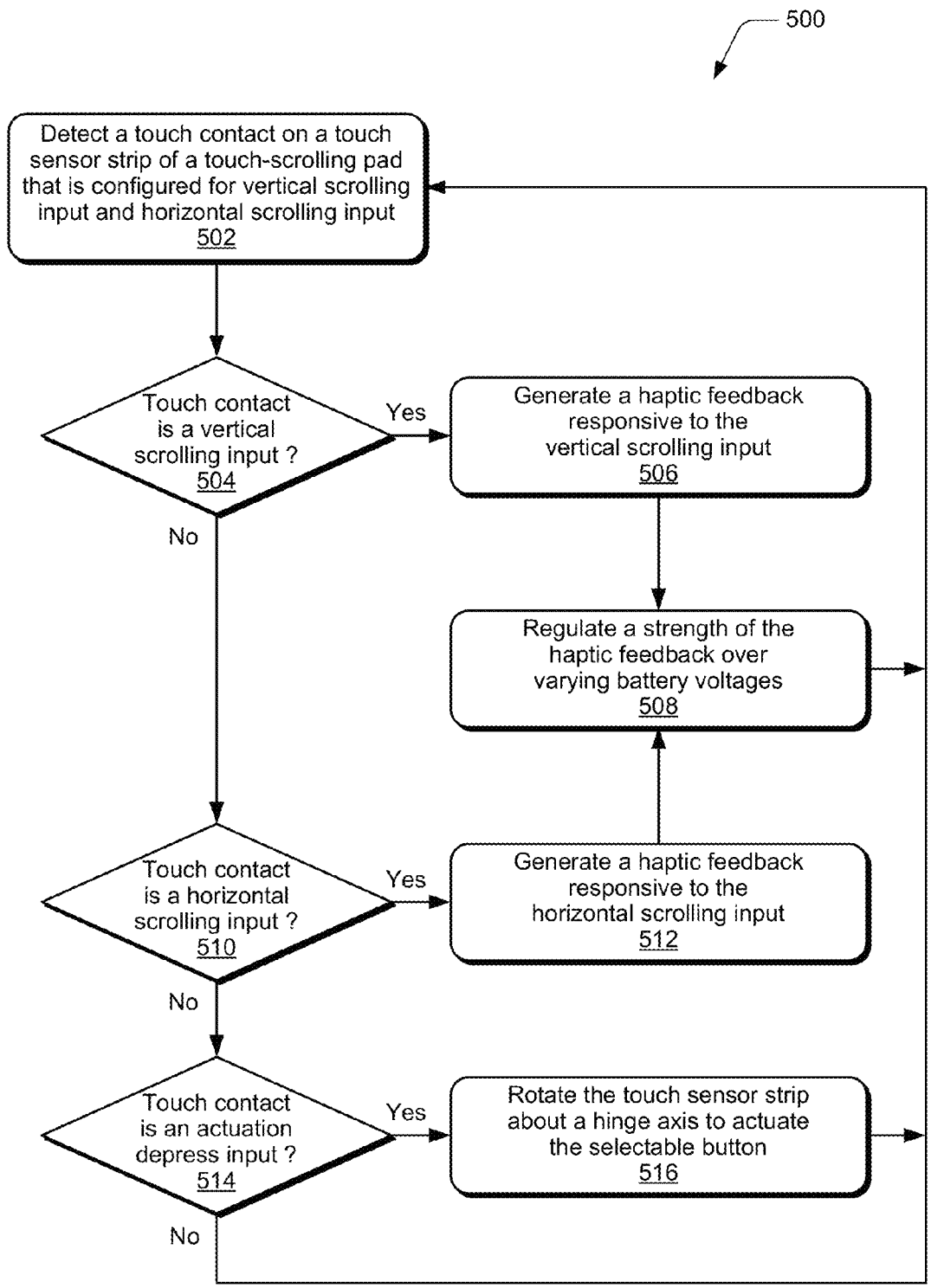
FIG. 5 illustrates example method(s) of a touch-scrolling pad for computer input devices in accordance with one or more embodiments.

FIG. 5 illustrates example method(s) 500 of a touch-scrolling pad for computer input devices. The order in which the method blocks are described are not intended to be construed as a limitation, and any number of the described method blocks can be combined in any order to implement a method, or an alternate method.

At block 502, a touch contact is detected on a touch sensor strip of a touch-scrolling pad that is configured for vertical scrolling input and horizontal scrolling input. For example, the touch sensor strip 108 of the touch-scrolling pad 102 (FIG. 1) detects a touch contact, such as a user input to initiate a vertical scrolling input or a horizontal scrolling input.

At block 504, a determination is made as to whether the touch contact is a vertical scrolling input. For example, the programmed firmware 126 (e.g., the programmed instructions 204 in firmware) determines whether the detected touch contact is initiated as a vertical scrolling input 206. If the touch contact is determined as a vertical scrolling input (i.e., yes from block 504), then at block 506, a haptic feedback responsive to the vertical scrolling input is generated. For example, the haptic system 114 of the touch-scrolling pad 102 generates the haptic feedback 212 that is discernible by a user of the computer mouse device 104, such as vibration 214 of the touch sensor strip. In embodiments, the touch sensor strip is designed for a mechanical freedom of movement and to vibrate for the haptic feedback. In an implementation, the touch sensor strip is suspended with the hinge 118 at a first end of the touch sensor strip and the spring assembly 120 at a second end of the touch sensor strip.

At block 508, a strength of the haptic feedback is regulated over varying battery voltages. For example, the programmed instructions in firmware 126 regulate a strength of the haptic feedback 212 over varying battery voltages. The method then continues at block 502 to monitor and/or detect a touch contact on the touch sensor strip of the touch-scrolling pad.

If the touch contact is not determined as a vertical scrolling input (i.e., no from block 504), then at block 510, a determination is made as to whether the touch contact is a horizontal scrolling input. For example, the programmed firmware 126 (e.g., the programmed instructions 204 in firmware) determines whether the detected touch contact is initiated as a horizontal scrolling input 208. If the touch contact is determined as a horizontal scrolling input (i.e., yes from block 510), then at block 512, a haptic feedback responsive to the horizontal scrolling input is generated. For example, the haptic system 114 of the touch-scrolling pad 102 generates the haptic feedback 212 that is discernible by a user of the computer mouse device 104, such as vibration 214 of the touch sensor strip.

In embodiments, the haptic feedback 212 is generated for a similar perception of vibration magnitude for both vertical scrolling inputs and horizontal scrolling inputs. Alternatively, the haptic feedback is generated at a first strength responsive to a vertical scrolling input, and generated at a second, different strength responsive to a horizontal scrolling input. The different strengths of the haptic feedback are generated to differentiate between a vertical scrolling input and a horizontal scrolling input. The strength of the haptic feedback is again regulated over varying battery voltages at block 508, and the method then continues at block 502 to monitor and/or detect a touch contact on the touch sensor strip of the touch-scrolling pad.

If the touch contact is not determined as a horizontal scrolling input (i.e., no from block 510), then at block 514, a determination is made as to whether the touch contact is an actuation depress input to select and actuate a selectable button that is proximate below the touch sensor strip. For example, the programmed firmware 126 (e.g., the programmed instructions 204 in firmware) determines whether the detected touch contact is initiated to actuate the selectable button 122 that is proximate below the touch sensor strip 108. If the touch contact is determined as an actuation depress input to select and actuate a selectable button (i.e., yes from block 514), then at block 516, the touch sensor strip is rotated about a hinge axis to actuate the selectable button. For example, the touch sensor strip 108 rotates about the hinge axis 124 (e.g., with the component support structure 110) to actuate the selectable button 122. The method then continues at block 502 to monitor and/or detect a touch contact on the touch sensor strip of the touch-scrolling pad.

Although embodiments of a touch-scrolling pad for computer input devices have been described in language specific to features and/or methods, the subject of the appended claims is not necessarily limited to the specific features or methods described. Rather, the specific features and methods are disclosed as example implementations of a touch-scrolling pad for computer input devices.

The invention claimed is:

1. A method, comprising:
   detecting a touch contact on a touch sensor strip of a touch scrolling pad that is configured for vertical scrolling input and horizontal scrolling input; and
   determining that the touch contact is an actuation depress input to select a selectable button that is proximate under the touch sensor strip, the actuation depress comprising rotating a first end of the touch sensor strip about a hinge axis at a second end of the touch sensor strip to actuate the selectable button.

2. A method as recited in claim 1, further comprising vibrating the touch sensor strip as a haptic feedback responsive to either of the vertical scrolling input or the horizontal scrolling input, the touch sensor strip suspended and configured for freedom of movement to vibrate.

3. A method as recited in claim 1, further comprising generating a haptic feedback responsive to either of the vertical scrolling input or the horizontal scrolling input, and wherein the haptic feedback is generated for a similar perception of vibration magnitude for both the vertical scrolling input and the horizontal scrolling input.

4. A method as recited in claim 1, further comprising:
   generating a haptic feedback responsive to either of the vertical scrolling input or the horizontal scrolling input;
   generating a first strength of the haptic feedback responsive to the vertical scrolling input; and
   generating a second, different strength of the haptic feedback responsive to the horizontal scrolling input, the first and second strengths of the haptic feedback generated to differentiate between the vertical scrolling input and the horizontal scrolling input.

5. A method as recited in claim 4, further comprising regulating a strength of the haptic feedback over varying battery voltages.

6. A method as recited in claim 1, further comprising:
   detecting an additional touch contact on the touch sensor strip of the touch scrolling pad;
   determining that the additional touch contact is a flick scrolling input detected as one of the vertical scrolling input or the horizontal scrolling input;
   determining an input momentum velocity of the flick scrolling input; and
   generating a flick scrolling distance of the vertical scrolling input or the horizontal scrolling input based on the determined input momentum velocity.

7. A touch-scrolling pad, comprising:
   a touch sensor strip configured to detect touch contacts on the touch-scrolling pad that is configured for vertical scrolling input and horizontal scrolling input; and
   programmed instructions configured to determine flick scrolling as a function of an input momentum velocity responsive to either of the vertical scrolling input or the horizontal scrolling input.

8. A touch-scrolling pad as recited in claim 7, further comprising a haptic system configured to generate haptic feedback responsive to either of the vertical scrolling input or the horizontal scrolling input.

9. A touch-scrolling pad as recited in claim 8, wherein the haptic system is configured to generate the haptic feedback for a similar perception of vibration magnitude for both the vertical scrolling input and the horizontal scrolling input.

10. A touch-scrolling pad as recited in claim 8, wherein the haptic system is configured to generate a first strength of the haptic feedback responsive to the vertical scrolling input, and is further configured to generate a second, different strength of the haptic feedback responsive to the horizontal scrolling input, the first and second strengths of the haptic feedback generated to differentiate between the vertical scrolling input and the horizontal scrolling input.

11. A touch-scrolling pad as recited in claim 8, wherein the haptic system is powered from a battery, and wherein the programmed instructions are further configured to regulate a strength of the haptic feedback over varying battery voltages.

12. A touch-scrolling pad as recited in claim 7, wherein the touch sensor strip is suspended and configured to vibrate as haptic feedback responsive to either of the vertical scrolling input or the horizontal scrolling input.

13. A touch-scrolling pad as recited in claim 7, further comprising a selectable button proximate below the touch sensor strip, the selectable button configured for selection by an actuation depress input to the touch- scrolling pad, and wherein a first end of the touch sensor strip is configured to rotate about a hinge axis at a second end of the touch sensor strip to actuate the selectable button.

14. A touch-scrolling pad as recited in claim 7, wherein the touch sensor strip comprises sensor regions by which the programmed instructions are configured to differentiate the horizontal scrolling input from the vertical scrolling input.

15. A touch-scrolling pad as recited in claim 7, wherein the touch sensor strip comprises programmable regions by which the programmed instructions are configured to distinguish touch-scrolling pad inputs.

16. A computer input device, comprising:
   a touch-scrolling pad configured for vertical scrolling input and horizontal scrolling input to a touch sensor strip that detects touch contacts, the touch-scrolling pad including programmed instructions configured to determine that a touch contact is one of the vertical scrolling input or the horizontal scrolling input; and a selectable button proximate under the touch sensor strip, the selectable button configured for selection by an actuation depress input to the touch-scrolling pad that rotates a first end of the touch sensor strip about a hinge axis at a second end of the touch sensor strip to actuate the selectable button.

17. A computer input device as recited in claim 16, wherein the touch sensor strip is suspended and configured to vibrate as haptic feedback responsive to either of the vertical scrolling input or the horizontal scrolling input.

18. A computer input device as recited in claim 16, further comprising a haptic system of the touch scrolling pad, wherein the haptic system is configured to one of:

generate haptic feedback for a similar perception of vibration magnitude for the vertical scrolling input and the horizontal scrolling input; or generate a first strength of the haptic feedback responsive to the vertical scrolling input, and generate a second, different strength of the haptic feedback responsive to the horizontal scrolling input.

19. A computer input device as recited in claim 16, wherein the touch sensor strip comprises sensor regions by which the programmed instructions are configured to differentiate the horizontal scrolling input from the vertical scrolling input.

20. A computer input device as recited in claim 16, wherein the programmed instructions are configured to:

determine that the touch contact is a flick scrolling input detected as one of the vertical scrolling input or the horizontal scrolling input;

determine an input momentum velocity of the flick scrolling input; and generate a flick scrolling distance of the vertical scrolling input or the horizontal scrolling input based on the determined input momentum velocity.

* * * * *